Figure 1:
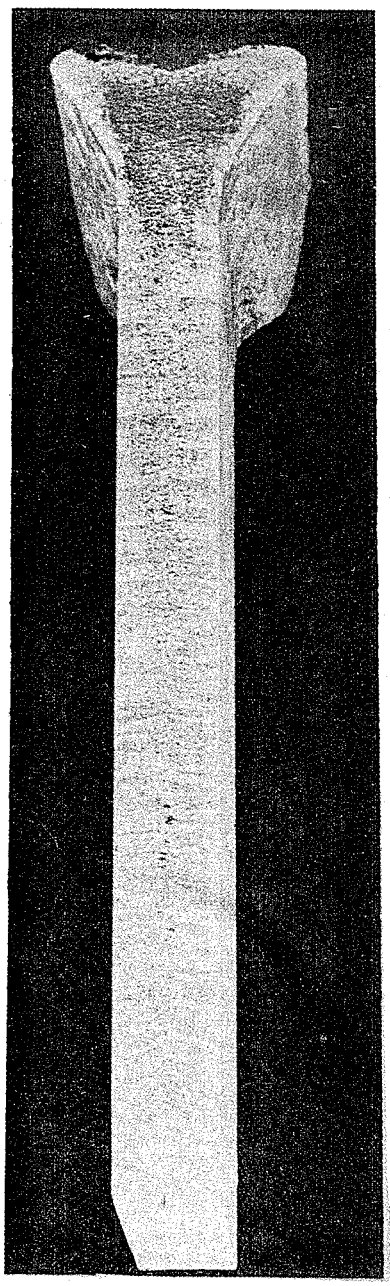

INVENTORS.
Marion L. Picklesimer
BY William C. Thurber

ATTORNEY

Aug. 23, 1960   M. L. PICKLESIMER ET AL   2,950,188
METHOD OF SUPPRESSING UAl₄ FORMATION IN U-Al ALLOYS
Filed Sept. 10, 1957   2 Sheets-Sheet 2

INVENTORS
Marion L. Picklesimer
BY  William C. Thurber

ATTORNEY

United States Patent Office 2,950,188
Patented Aug. 23, 1960

2,950,188

METHOD OF SUPPRESSING UAl₄ FORMATION IN U-Al ALLOYS

Marion L. Picklesimer, Knoxville, and William C. Thurber, Oak Ridge, Tenn., assignors to the United States of America as represented by the United States Atomic Energy Commission Filed Sept. 10, 1957, Ser. No. 683,192

5 Claims. (Cl. 75—122.7)

The present invention relates to a novel composition for neutronic reactor fuel elements.

As is well known, aluminum has become a standard material of fabrication in the neutronic reactor art, due primarily to its relatively low absorption cross section for thermal neutrons and its low cost. Aluminum has a cross section of only 0.21 barn. The metal has been used extensively in the fabrication of sandwich-type fuel elements which have been used successfully in the Materials Testing Reactor (MTR) which is described in the co-pending application of the common assignee Serial No. 360,190, filed June 8, 1953, in the name of Eugene P. Wigner for Fuel Element for a Neutronic Reactor, which issued on April 29, 1958, as Patent No. 2,832,732. The MTR is also described completely in the report "Materials Testing Reactor Project Handbook," TID-7001, available from the Office of Technical Services, Department of Commerce, Washington, D.C.

The MTR type fuel element is composed of an assembly of curved plates, each curved plate being a "sandwich-type" subassembly. In the uranium-aluminum alloy type fuel plate, the inner or central portion of the plate comprises the alloy, and the entire central portion is protected by a layer of aluminum to prevent exposure of the fuel material to reactor cooling media and to enclose the by-products of fission. The fuel plate is fabricated by a highly complex process which is described in the Geneva Conference paper, MTR-Type Fuel Elements, J. E. Cunningham and E. J. Boyle, A/Conf. 8/P/953, July 6, 1955.

In the prior art, aluminum has been alloyed directly with uranium and it has been the practice to use highly enriched uranium (~ 90%) in reactors such as the MTR. Fuel elements which contain essentially pure $U^{235}$ are suitable for burning only and not for the conversion of $U^{238}$ to plutonium because very little $U^{238}$ is present. Furthermore, highly enriched uranium is inherently expensive to produce since $U^{235}$ exists in naturally occurring uranium only to the extent of approximately 0.7%. It is also undesirable to place outside the direct physical custody of the Government highly enriched uranium which may be suitable for the production of atomic weapons. Accordingly, great interest has recently been shown in the development of MTR-type fuel elements containing slightly enriched uranium. It should be apparent that slightly enriched fuel elements for existing reactors and reactor designs must contain a higher concentration of uranium than was required for the prior highly enriched fuel elements.

In the past, uranium-aluminum alloys have been characterized by inherent difficulties of fabrication into fuel elements for neutronic reactors. We have now discovered that the fabricational difficulties are caused to a large extent by the brittle intermetallic compound UAl₄.

At low uranium contents in the alloy, the intermetallic compound UAl₄ is not present in large enough quantities to make the fabricational problems insurmountable, but as the percentage of uranium in the alloy is increased as a result of decreasing the degree of enrichment in $U^{235}$ the percentage of the intermetallic compound UAl₄ is correspondingly increased. As a result, the fabrication difficulties became very serious and, in fact, insurmountable for high uranium concentrations, prior to our invention. As a consequence, all attempts to fabricate fuel elements from uranium, only slightly enriched in the $U^{235}$ isotope, were plagued by the presence of large amounts of UAl₄.

In order to discuss the problems which are encountered, it will be necessary to summarize a portion of the process for fabricating the fuel plates. Briefly, the initial part of the process is as follows:

(1) The Al-U melt is prepared in a graphite crucible.
(2) The melt is poured into a graphite mold.
(3) The cast-alloy slab is heated for 3 hours at 590° C. and hot rolled to 0.25 in. thickness
(4) Cores are punched from the center of the rolled slab.
(5) The core is enclosed by the "picture frame" technique and hot rolled at 590° C. to a thickness of 0.060 in. in order to produce a metallurgical bond. The "picture frame" technique is a method of cladding the core with a protective material such as aluminum. The core is inserted into a "picture frame" of aluminum which encloses the four lateral sides of the core material. Aluminum cover sheets are placed on top of and beneath the "picture frame" assembly, thereby covering the top and bottom surfaces of the core.

The above process is used successfully to produce fuel plates containing uranium present in concentrations below 25%. It was discovered, however, that when the uranium concentration was increased to values above 25%, the process outlined above was completely inadequate. The initial hot rolling of the cast-alloy slab (step 3 above) was found to be inadequate in that castings containing uranium in high concentrations were subject to extreme cracking and disintegration. It then became necessary to employ the "picture frame" technique at this point (step 3) also.

The disadvantages of the "picture frame" technique as applied to the initial hot rolling (step 3) of the cast alloy are multitudinous. First, the technique is time consuming in that it requires additional labor to fabricate and assemble the "picture frame" components prior to rolling. Secondly, the center portion of the rolled casting, which is punched out in step 4, is also diluted with aluminum from the cover sheets, thereby introducing uncertainties into the detemination of the uranium content of the final composite fuel plate. Thirdly, three layers of material result in the finished fuel plate as a result of this technique (i.e., the core material, the aluminum from the first "picture frame," and the cladding aluminum from the second "picture frame"). Consequently, two metal-to-metal bonds are required rather than the one aluminum-to-alloy bond which would be present if the first "picture frame" could be discarded. The increased number of bonds increases the probability of blister formation in the finished fuel plate.

It was also discovered that the finished composite fuel plates displayed a thinning of the aluminum cladding at the ends of the fuel plates due to a thickening of the core material in these regions. The core material showed a tendency to "pile-up" near the ends of the fuel plate during the rolling process. This phenomenon has been termed "dog-boning" in the art. Numerous attempts were made to avoid this fabrication problem by the use of higher strength aluminum alloys for the cladding but these attempts were characterized by generally unsatisfactory results.

It is, therefore, a general object of our invention to provide means for suppressing the formation of $UAl_4$ in uranium-aluminum alloys.

Another object of our invention is to provide a satisfactory uranium-aluminum type neutronic reactor fuel composition which is easily processed irrespective of uranium content.

A further object of our invention is to provide a satisfactory uranium-aluminum "sandwich" type fuel element which is easily fabricated irrespective of uranium content.

A still further object of our invention is to provide a satisfactory uranium-aluminum alloy-type "sandwich" fuel element containing more than twenty-five weight per cent uranium.

A still further object of our invention is to provide a satisfactory U-Al alloy which can be cast and subsequently hot rolled without a protective cladding.

These and other objects of our invention will become apparent from the following detailed description of our invention when read in conjunction with the appended claims.

In accordance with our invention, the information of the intermetallic compound $UAl_4$ in uranium-aluminum alloys is suppressed by the addition of an element selected from the group consisting of Si, Ti, Ge, Zr, Sn, Pb, In, Tl, Fe, Nb, and Ga, thereby substantially increasing the concentration of the preferable $UAl_3$ and reducing the fabrication problems of the U-Al alloy. We have discovered that the addition of any of the above elements reduces "dogboning" sufficiently so that satisfactory fuel elements can be fabricated by standard processes.

Our invention is applicable to uranium-aluminum alloys in which the uranium concentration is within the range of 3.5 to 10 atomic percent and the aluminum concentration is within the range of 90.0 to 96.5 atomic percent. The design of present reactors such as the MTR has dictated that the uranium concentration be 9.4 atomic percent for fuel elements utilizing uranium containing 20 wt. percent $U^{235}$.

Our invention is, therefore, especially applicable to the 9.4 atomic percent uranium fuel element and the following discussion will be primarily directed toward this alloy.

The suppression of $UAl_4$ in the U-Al alloys discussed above may be carried out utilizing any of the above elements but we have found that certain of the group IV elements, i.e., Si, Ti, Ge, Zr, and Sn, function as $UAl_4$ suppressors to a greater degree and of this group Si is the preferred element. The addition should be present in concentrations less than 20 atomic percent preferably within the range of 0.5–20 atomic percent, and most desirably, for the group IV elements, within the concentration range of 1–5 atomic percent. The most desirable concentration of silicon is 5 atomic percent.

Ternary alloys resulting from the above ternary additions will have uranium concentrations within the range of 3.5–10 atomic percent, ternary-addition concentrations within the range of 0.5–20 atomic percent, and aluminum concentrations within the range of 70–96 atomic percent.

All of the above ternary compositions will display a much lower concentration of the undesirable intermetallic compound $UAl_4$ and a much greater concentration of $UAl_3$ than the binary uranium-aluminum alloys, which is extremely desirable from the viewpoint of fuel element fabrication. The presence of any ternary additive in concentrations greater than 0.5 atomic percent will result in a $UAl_3$ concentration greater than 20 wt. percent and a $UAl_4$ concentration less than 42 wt. percent. The presence of the preferable group IV elements in concentrations greater than 1.2 atomic percent will result in an alloy containing $UAl_3$ in concentrations greater than 60 wt. percent and less than 8 wt. percent $UAl_4$. The presence of the preferred silicon in concentrations greater than 5 atomic percent will result in the complete suppression of $UAl_4$ and a $UAl_3$ concentration of 65 wt. percent. Our new compositions, therefore, are characterized by at least 20 wt. percent of $UAl_3$ and no more than 42 wt. percent $UAl_4$; more preferably by at least 60 wt. percent $UAl_3$ and no more than 8 wt. percent $UAl_4$; and most preferably by 65 wt. percent $UAl_3$ and complete suppression of $UAl_4$.

Alloys of this type can be prepared by melting the constituents in any order, but it is preferable to prepare them by melting the aluminum, adding the ternary additive, raising the temperature to dissolve the additive, adding the uranium and heating to complete fusion of the ternary alloy. Subsequent cooling will yield an alloy having desirable fabricational properties.

Table I shows the effect of various ternary additions upon the 48 wt. percent uranium-aluminum alloy. It can be seen that 55% $UAl_4$ and 45% Al is the equilibrium composition of this alloy.

TABLE I

*Effect of ternary alloy additions on the suppression of $UAl_4$ in 48 wt. percent U–3 wt. percent "X"–Al alloys*

| Ternary Addition | Ternary Metal Content, Wt. Percent | Ternary Metal Content, At. Percent | Spectrometer Trace | | |
|---|---|---|---|---|---|
| | | | Percent $UAl_3$ | Percent $UAl_4$ | Percent Al |
| Si | 3 | 5.0 | 65 | | 35 |
| Ti | 3 | 3.0 | 67 | 8 | 25 |
| Ge | 3 | 2.0 | 60 | | 40 |
| Zr | 3 | 1.6 | 70 | | 30 |
| Sn | 3 | 1.2 | 70 | | 30 |
| Pb | 3 | 0.7 | 20 | 40 | 40 |
| In | 3 | 1.3 | 35 | 35 | 0 |
| Tl | 3 | 0.7 | 21 | 38 | 41 |
| Fe | 3 | 2.6 | 20 | 38 | 42 |
| Nb | 3 | 1.6 | 24 | 42 | 34 |
| (*) | | | | 55 | 45 |

*No ternary addition (48 U-Al).

Referring now to Fig. 1, which is a longitudinal sectional view of a slab-like 48 wt. percent U-Al alloy casting prior to cropping and rolling, it can be seen that columnar grains extend inwardly from the surfaces of the casting. Planes of weakness result where inwardly extending grains meet; therefore, the casting is susceptible to fracture along these planes during hot rolling operations. This is one reason why the "picture frame" technique was used in the initial hot rolling of castings prior to our invention.

Figure 2:
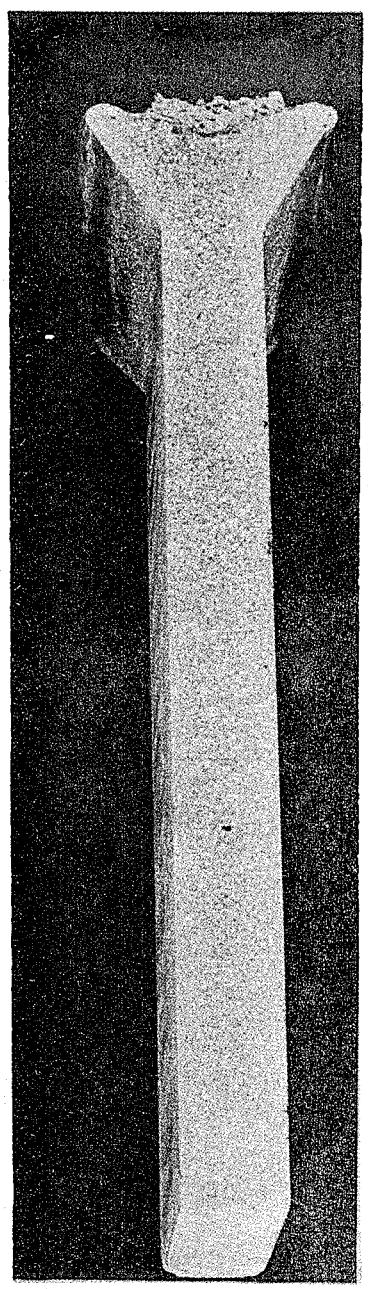

Referring now to Fig. 2, which is a longitudinal sectional view of a slab-like casting of an alloy having a ternary addition of silicon, it is apparent that the columnar grain structure, which occasioned the planes of weakness, has been changed to a completely equi-axed structure which exhibits no planes of weakness. The ternary alloy (e.g. 48% U, 3% Si, and 49% Al) can be hot rolled without utilizing the "picture frame" technique. Unframed rolling of our ternary alloy has now completely replaced the "picture frame" rolling of the prior alloy which did not contain the ternary addition. In addition, the ternary alloy does not manifest casting porosity while the prior alloy displayed porosity to a great degree as can be seen from an examination of Figs. 1 and 2. In order to derive a quantitative comparison of the hot-rolling properties, a comparison was made of the edge cracking of hot rolled slabs containing various amounts of silicon. Since the prior art alloy (48% U, 52% Al) disintegrated under bare rolling, the "picture frame" technique was used in all cases. All samples were heated to 600° C. and rolled according to the following schedule:

SCHEDULE

| | Percent |
|---|---|
| 1st pass | 15 |
| 2nd pass | ¹15 |
| 3rd pass | 20 |
| 4th pass | 20 |
| 5th pass | 20 |
| 6th pass | 20 |
| 7th pass | 20 |

Finish to 0.228 in.

¹ Cross roll.

Reheat the billet 10 minutes between passes. The length of the edge cracks that were obtained is indicative of the fabricational qualities of the casting. Table II summarizes the results of this experimental work.

TABLE II

Effects of silicon on edge cracking and suppression of $UAl_4$ in hot-rolled 48 wt. percent U-Al alloy slabs

| Slab | Sample Location | Analyzed Uranium Content, Wt. Percent | Analyzed Silicon Content, Wt. Percent | Al | UAl₃ | UAl₄ | Maximum Length of Edge Crack, Inch |
|---|---|---|---|---|---|---|---|
| Si-1-S | Top | 49.45 | 0.05 | 50 | | 50 | 9/16 |
| | Bottom | 46.53 | 0.05 | 50 | | 50 | |
| Si-2-S | Top | 50.67 | 1.05 | 35 | 55 | 10 | 7/16 |
| | Bottom | 47.19 | 0.98 | 35 | 50 | 15 | |
| Si-3-S | Top | 49.90 | 2.11 | 33 | 63 | 4 | 7/16 |
| | Bottom | 46.25 | 1.90 | 33 | 63 | 4 | |
| Si-4-S | Top | 48.12 | 2.98 | 40 | 60 | | 5/16 |
| | Bottom | 48.24 | 2.98 | 40 | 60 | | |

An examination of Table II reveals that the length of edge cracking is reduced by more than 40 percent by the addition of 3 wt. percent silicon. It also reveals that $UAl_4$ is completely suppressed by 3% silicon, but it is interesting to note that the first one percent of silicon eliminates about 80% of the $UAl_4$. We have conducted further experiments which reveal that additions of silicon in excess of 5 atomic percent but less than 20 atomic percent continue to completely suppress $UAl_4$ and do not introduce new fabricational problems.

Figure 3:
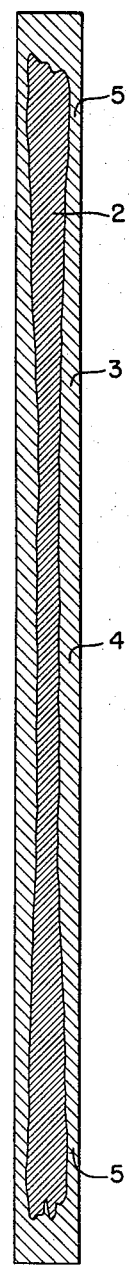

Referring now to Fig. 3, which is a longitudinal cross-section of a fuel plate, the core-alloy 2 is shown in a deleterious "dog bone" configuration within the aluminum cladding 3. One can readily see that the cladding thickness is not uniform in the longitudinal direction; that is, the cladding is thickest at 4 and thinnest at 5. The most desirable configuration for an MTR-type fuel element is that having a constant cladding thickness of approximately 17 mils. The degree of "dog boning" is usually expressed in terms of the maximum departure from the desired cladding thickness which usually occurs at the ends of the fuel plate. Table III shows the effect of the ternary addition upon "dog boning."

TABLE III

| Plate | Core Composition | Maximum Departure From Desired Thickness of 17 mils |
|---|---|---|
| 1 | 48% U—52% Al | 11 mils. |
| 2 | 48% U—1% Si—51% Al | 12 mils. |
| 3 | 48% U—2% Si—50% Al | 10.5 mils. |
| 4 | 48% U—3% Si—49% Al | 7.5 mils. |

An inspection of Table III shows that a 3% addition of Si is sufficient to reduce the degree of "dog boning" by 33% to a value which is low enough so that the resultant fuel plates can be incorporated successfully in an operating reactor. "Dog boning" in prior-art fuel elements became so serious in some cases that rupture of the cladding occurred which exposed the fuel alloy. A fuel element failure such as this in an operating reactor is intolerably dangerous since the by-products of fission can then contaminate the cooling medium. We have not observed one failure due to "dog boning" in fuel elements utilizing our invention.

The following example is offered as illustrative of one manner in which our invention may be practiced. The fabrication of one fuel plate is described.

Example.—2450 g. of Al, 2400 g. of U, and 150 g. of silicon were weighed and prepared for melting. The aluminum was melted in a graphite crucible by an open-air induction furnace and heated to 800° C. The silicon was added at 800° C. and the resultant mixture was then raised to 900° C. where the uranium was introduced to form the ternary mixture. In order to insure complete dissolution of all components, the ternary melt was heated to 1175–1200° C. and stirred with a graphite rod.

For fuel element fabrication the melt must contain a low gas concentration, therefore, the melt was cooled to 600° C. and returned to 1175° C. five times. The melt was then poured at 1175° C. into a graphite mold having a temperature of 300–325° C. Mold dimensions were 5¾" x 1" x 10" and the mold was affixed with a trapezoidal feeding head to minimize casting defects.

After the casting had cooled, it was removed from the mold and the head sawed from the main casting at a point 9½" from the bottom of the casting to form a cropped billet. The casting at this point manifested an equi-axed grain structure as opposed to the columnar grain structure which was obtained in prior castings that did not contain the ternary alloy of our invention. This enabled us to roll the billet without a "picture frame." The initial step of the bare rolling process was heating the billet to 600° C. and holding it at that temperature for three hours. It was then rolled according to the following schedule.

SCHEDULE

| | Percent |
|---|---|
| 1st pass | 15 |
| 2nd pass | ¹15 |
| 3rd pass | 20 |
| 4th pass | 20 |
| 5th pass | 20 |
| 6th pass | 20 |
| 7th pass | 20 |

Finish to 0.228 in.
Reheat the billet 10 minutes between passes.

¹ Cross roll.

Sixteen cores 2.3 in. wide by 3.0 in. in length were then punched from the rolled billet and each core was weighed. The punched cores were completely adequate for fuel plate fabrication. The sixteen cores were then pressed into sixteen aluminum frames which were 0.223 in. thick, 4.5 in. wide, 6.0 in. in length, and contained a centered "window" having the same dimensions as the fuel core (i.e. 2.3 in. x 3.0 in.). The framed cores were heated at 575–600° C. for ½ hour and subsequently rolled to 0.180 in. in two equal passes. Two cover plates having a thickness of 0.120 in. were then attached to the framed and partially-rolled core, thereby completely enclosing the core. The resultant assembly was heated for ½ hour at 575–600° C. and then rolled to a thickness of 0.065 in. at 35% reduction per pass. The assembly was reheated for 10 minutes between each pass. Flux annealing at 607° C. for one hour using a slurry of eutectic 190 flux in methyl alcohol as a fluxing agent followed the hot rolling process. After the flux was removed by washing and an acid etch, the plates were cold-rolled to a final thickness of 0.060 inch. Stress relieving at 540° for 45 minutes followed and the plates were then cut and machined to size. A blister anneal at 607° C. for one hour yielded composite fuel plates which manifested a significant reduction in "dog boning."

Fuel plates which are made according to our invention as described in the above example can be used successfully in the MTR, Bulk Shielding Reactor, and the Low Intensity Training Reactor (LITR), all of which are described in The Reactor Handbook, volume 2, AECD–3646, May 1955, and in other reactors of similar design.

The preceding example and discussion are directed toward the plate type fuel element, but it should be obvious to one skilled in the art that the advantages derived from the utilization of our invention may be derived irrespective of specific structural form. It should also be appreciated that problems such as "dog boning" may be encountered and suppressed by our invention irrespective of fuel-element configuration, provided that the fuel element is of the cladded-core variety. The advantage of the increased adaptability of our ternary alloy to the hot-rolling process is manifested in any situation wherein a uranium-aluminum bearing alloy is to be processed by mechanical distortion.

Since many changes can be made within the scope of our invention, our invention should be limited only as indicated by the appended claims and not by the preceding illustrative example.

Having described our invention, we claim:

1. A method for suppressing the formation of $UAl_4$ in U-Al alloys, which comprises incorporating in said alloy an element of group 4 of the periodic table, said element being selected from the group consisting of Si, Ti, Ge, Zr, and Sn.

2. The method of claim 1 wherein the concentration of said element is within the range of 0.5–20 atomic percent.

3. The method of claim 2 wherein the concentration of said element is within the range of 1–5 atomic percent.

4. The method of claim 1 wherein said element is silicon.

5. The method of claim 4 wherein the concentration of said element is 5 atomic percent.

References Cited in the file of this patent

UNITED STATES PATENTS

| | | |
|---|---|---|
| 2,743,174 | Keeler et al. | Apr. 24, 1956 |
| 2,778,730 | Spedding et al. | Jan. 22, 1957 |
| 2,798,848 | Kingdon | July 9, 1957 |
| 2,799,642 | Hurwitz et al. | July 16, 1957 |

OTHER REFERENCES

Reactor Core Materials, March 1958, prepared by Battelle Memorial Institute. Price 55¢. Available from Supt. of Documents, U.S. Gov't Printing Office, Washington 25, D.C. Pages 7, 16. (In conjunction with the reference to Nuclear Fuels Newsletter WASH–703, August 1957.)